(12) United States Patent
Banerjea

(10) Patent No.: US 8,811,426 B1
(45) Date of Patent: Aug. 19, 2014

(54) METHOD AND APPARATUS FOR DYNAMICALLY SWITCHING AN OPERATING BANDWIDTH OF A WIRELESS TRANSCEIVER

(75) Inventor: Raja Banerjea, Sunnyvale, CA (US)

(73) Assignee: Marvell International Ltd. (BM)

( * ) Notice: Subject to any disclaimer, the term of this patent is extended or adjusted under 35 U.S.C. 154(b) by 56 days.

(21) Appl. No.: 13/461,273

(22) Filed: May 1, 2012

Related U.S. Application Data

(60) Provisional application No. 61/483,608, filed on May 6, 2011, provisional application No. 61/486,478, filed on May 16, 2011.

(51) Int. Cl.
*H04J 3/16* (2006.01)

(52) U.S. Cl.
USPC ....................................... 370/468

(58) Field of Classification Search
USPC ......... 370/400, 401, 432–433, 437, 462, 464, 370/465, 468
See application file for complete search history.

(56) References Cited

U.S. PATENT DOCUMENTS

| | | | |
|---|---|---|---|
| 2007/0058534 A1* | 3/2007 | Shimonishi et al. | 370/230 |
| 2007/0220149 A1* | 9/2007 | Kawashima et al. | 709/226 |
| 2011/0110349 A1 | 5/2011 | Grandhi | |
| 2012/0124231 A9* | 5/2012 | Richardson et al. | 709/229 |
| 2012/0291043 A1* | 11/2012 | Stubbs et al. | 718/104 |
| 2013/0094462 A1* | 4/2013 | Montojo et al. | 370/329 |

* cited by examiner

*Primary Examiner* — Kerri Rose

(57) ABSTRACT

Systems, methods, and other embodiments associated with bandwidth switching are described. According to one embodiment, an apparatus includes a transceiver configured to operate at a first bandwidth. A bandwidth controller is configured to detect an operating condition of the apparatus and select a second bandwidth from a plurality of available bandwidths based on the operating condition, and cause the transceiver to temporarily operate at the second bandwidth and then cause the transceiver to subsequently operate at the first bandwidth.

17 Claims, 5 Drawing Sheets

METHOD AND APPARATUS FOR DYNAMICALLY SWITCHING AN OPERATING BANDWIDTH OF A WIRELESS TRANSCEIVER

CROSS REFERENCE TO RELATED APPLICATIONS

This patent disclosure claims the benefit of U.S. Provisional Application No. 61/483,608 filed on May 6, 2011, and of U.S. Provisional Application No. 61/486,478 filed on May 16, 2011, which are incorporated herein by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

IEEE 802.11 is a set of standards that govern wireless networking transmission methods. Versions of the set of standards of IEEE 802.11 that are commonly used today to provide wireless connectivity include 802.11a, 802.11b, 802.11g, and 802.11n.

IEEE 802.11ac is a wireless computer networking standard of 802.11 currently under development which will provide high throughput Wireless Local Area Networks (WLAN) below 6 GHz, which is commonly known as the 5 GHz band. The IEEE 802.11ac specification describes multi-station WLAN throughput of at least 1 Gigabit per second and a maximum single link throughput of at least 500 megabits per second (500 Mbit/s). This is accomplished by extending the air interface concepts embraced by IEEE 802.11n with wider radio frequency (RF) bandwidth (e.g., IEEE 802.11ac permits channel bandwidths of 80 MHz and 160 MHz as compared with a maximum channel bandwidth of 40 Mhz in 802.11n), more MIMO spatial streams (up to 8), multi-user MIMO, and high-density modulation (up to 256 QAM Quadrature amplitude modulation).

However, operating an RF radio and analog front end to receive and transmit packets having a bandwidth of 80 MHz or 160 MHz typically consumes a substantial amount power.

SUMMARY

In one embodiment, an apparatus includes a transceiver configured to operate at a first bandwidth. A bandwidth controller is configured to detect an operating condition of the apparatus and select a second bandwidth from a plurality of available bandwidths based on the operating condition, and cause the transceiver to temporarily operate at the second bandwidth and then cause the transceiver to subsequently operate at the first bandwidth.

In another embodiment, a method includes operating a transceiver at a first bandwidth, wherein the transceiver is implemented in a communication device. An operating condition of the communication device is detected and a second bandwidth is selected from a plurality of available bandwidths based on the operating condition. The transceiver is switched to temporarily operate at the second bandwidth and then the transceiver is caused to subsequently operate at the first bandwidth.

In another embodiment, an integrated circuit includes a transceiver configured to operate at a first bandwidth. A bandwidth controller is configured to detect an operating condition of the transceiver; select a second bandwidth from a plurality of available bandwidths based on the operating condition; and cause the transceiver to temporarily operate at the second bandwidth and then cause the transceiver to subsequently operate at the first bandwidth

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or that multiple elements may be designed as one element. In some examples, an element shown as an internal component of another element may be implemented as an external component and vice versa.

DETAILED DESCRIPTION

Described herein are systems, methods, and other embodiments associated with controlling an operating bandwidth of a wireless transceiver (referred to more generally as "transceiver" herein). In an embodiment, the operating bandwidth of a transceiver corresponds to a bandwidth of packets that are receivable by the transceiver—e.g., a transceiver. As previously stated, operating a communication device at larger bandwidths increases throughput but at the cost of consuming greater amounts of power. The present systems and methods provide a mechanism and technique to reduce power consumption through dynamic switching an operating bandwidth of a transceiver. In one embodiment, power is saved by opportunistically switching the operating bandwidth of a transceiver when a detected condition occurs. In another embodiment, power is saved by changing the operating bandwidth of the transceiver and controlling another device to communicate at the changed bandwidth via an element associated with a packet transmitted to the other device (e.g., a very high throughput (VHT) operational element of a packet).

Figure 1:
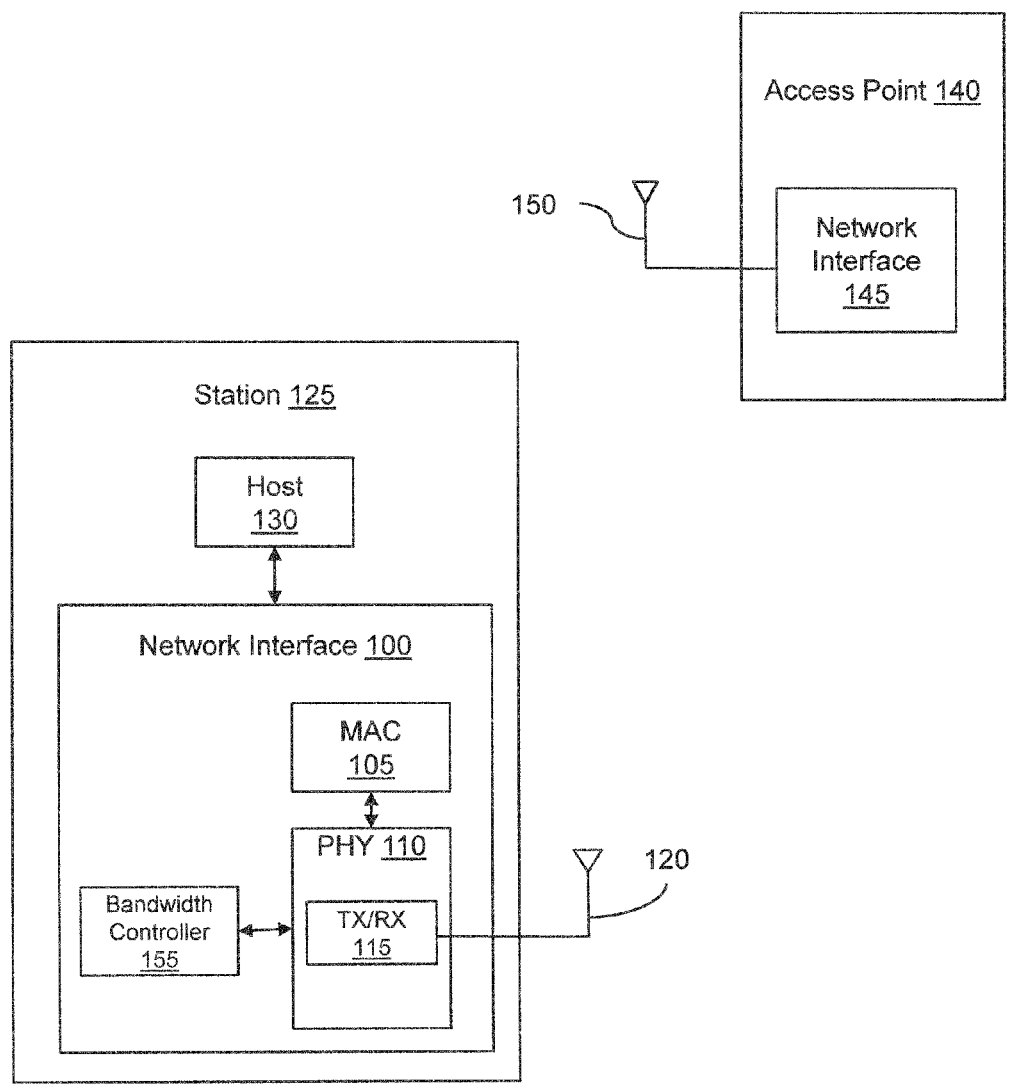
FIG. 1 illustrates one embodiment of a device associated with a bandwidth controller.

With reference to FIG. 1, one embodiment of a network interface 100 is shown that is associated with bandwidth switching. The network interface 100 includes a medium access control (MAC) processing unit 105 and a physical layer (PHY) processing unit 110. The PHY processing unit 105 includes a transceiver 115 (TX/RX), and the transceiver 115 is coupled to an antenna 120.

The network interface 100 is implemented in a station 125. The station 125 can be a client device, portable computer, smart phone, gaming station, server, router, or other device than is implemented to communicate in a network. The station 125 includes at least a host processer 130 coupled to the network interface 100. The station 125 may also include memory, a storage device, a display, input devices, and battery power supply, which are not shown. Although one transceiver 115 and one antenna 120 is illustrated in FIG. 1, the station 125 or the network interface 100 can include different numbers (e.g., 1, 2, 4, 5, etc.) of transceivers and antennas in other embodiments. In one embodiment, the MAC processing unit 105 and the PHY processing unit 20 are configured to operate according to one or more wireless communication protocols (e.g., any version of IEEE 802.11, IEEE 802.11 ac standard or other protocol).

In one embodiment, the network interface 100 is implemented on a chip or circuit board card including one or more integrated circuits configured to perform at least one or more of the functions described herein.

The station 125 may communicate with one or more other remote devices on the network such as another station, or network device with any suitable wireless communication link as implemented by the network interface 100 (e.g., radio frequency (RF), microwave, infrared (IR), ultraviolet (UV), visible light, etc.). The following discussion is based on using RF communication signals and communicating with an access point 140, which includes a compatible network interface 145 and antenna 150.

In one embodiment, example channel bandwidths will be discussed as 20 MHz, 40 MHz, 80 MHz, 160 MHz, and 80+80 MHz (e.g., as defined by IEEE 802.11n, 802.11ac, TGac). However, other bandwidths may be used as defined by implemented protocols and standards as they are developed.

As previously stated, IEEE 802.11ac is a wireless computer networking standard currently under development which will provide high throughput Wireless Local Area Networks (WLAN) below 6 GHz. The standard provides for wider RF bandwidth (up to 160 MHz) than 802.11n but operating the transceiver 115 continuously at higher bandwidths (80 MHz or 160 MHz) consumes much power.

Thus in one embodiment, a bandwidth controller 155 is provided to dynamically control the operating bandwidth of the transceiver 115. For example, the operating bandwidth is changed/switched between high and low bandwidths based on a detected operating condition from the station 125 or the transceiver 115. By selectively reducing and increasing the bandwidth, power consumption may be reduced and conserved while providing appropriate throughput when needed. In one embodiment, the bandwidth controller 155 is configured to opportunistically switch the operating bandwidth of the transceiver 115 (e.g., bandwidth switched based on a detected condition). An example configuration and process of operation are discussed with reference to FIG. 2.

Figure 2:
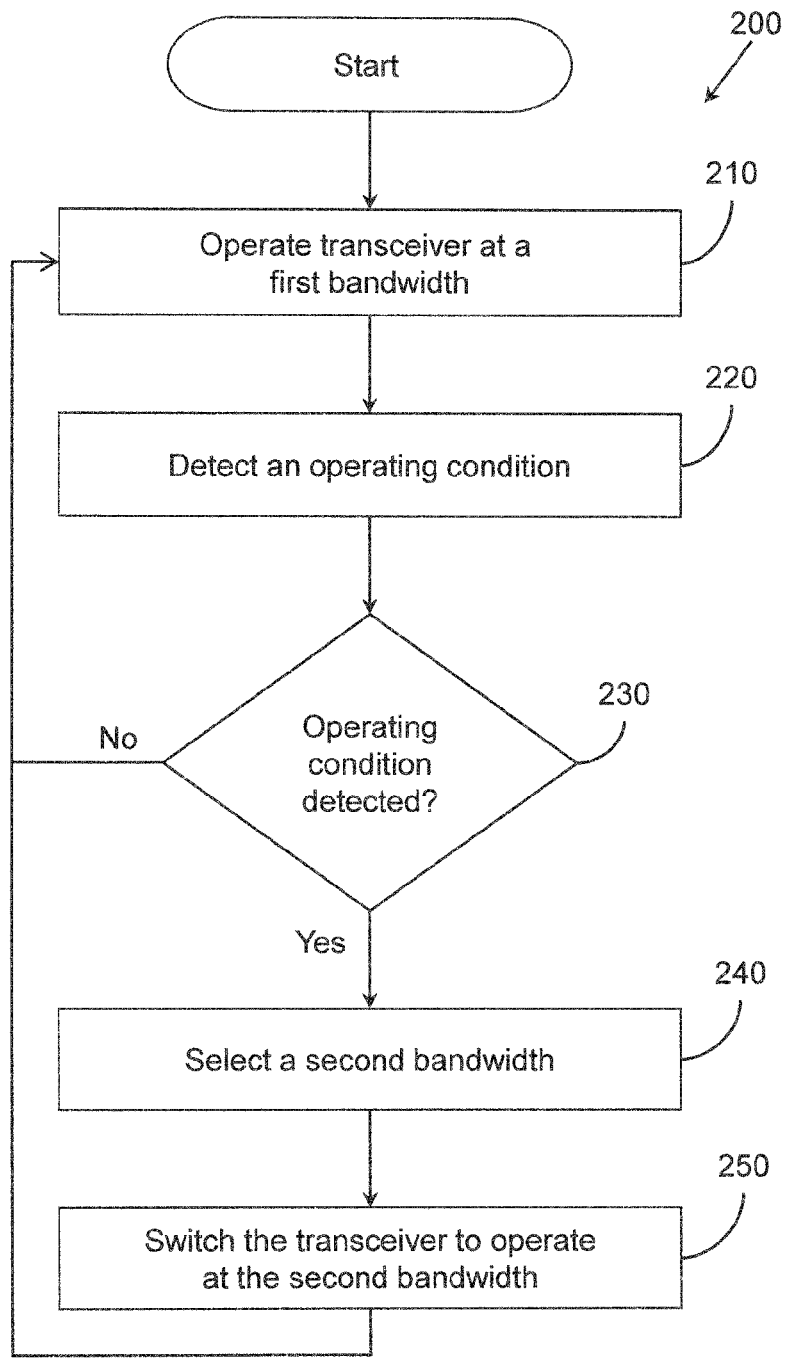
FIG. 2 illustrates one embodiment of a method associated with switching bandwidth.

FIG. 2 illustrates one embodiment of a method 200 associated with controlling an operating bandwidth of a transceiver, e.g., to conserve power. Method 200 is performed, for example, by the bandwidth controller 155 of FIG. 1 and will be described with reference to the components of FIG. 1. In an embodiment, the transceiver 115 is capable of operating at a variety of different available bandwidths in accordance with an implemented protocol. For this discussion, the available bandwidths are 0 MHz, 20 MHz, 40 MHz, 80 MHz, 160 MHz, and 80+80 MHz but the disclosure is not intended to be limited to these bandwidths.

At 210, initially, the transceiver 115 is set to operate at a first bandwidth. In one embodiment, the first bandwidth is a low power consuming bandwidth relative to the other available bandwidth. For example, operating at 20 MHz consumes less power than operating at 80 MHz. Thus suppose the first bandwidth is 20 MHz. At 220, an operating condition is detected that occurs in the station 125 or transceiver 115. The operating condition is an event or change of state in the station 125 where it has been determined that the station 125 will benefit from operating the transceiver at a different bandwidth. Thus the bandwidth controller 155 is configured to make an opportunistic determination as to when the bandwidth should be changed. Examples of the operating condition are provided below.

At 230, if the operating condition has not been detected, then the method continues to operate the transceiver 115 at the current bandwidth. If at 230 the operating condition has been detected, the method moves to 240 where a second bandwidth is selected from the available operating bandwidths. In general, since the transceiver 115 is controlled to conserve power and is operating at a lower bandwidth (e.g., 20 MHz first bandwidth), the second bandwidth selected is one that provides greater bandwidth (e.g., 80 MHz, 160 MHz) to perform a task that is associated with the detected operating condition. In the discussion, the selected bandwidth is referred to as a temporary bandwidth since the transceiver 115 is switched to operate at the higher bandwidth temporarily (for a limited time period) and then the transceiver 115 is caused to subsequently operate at the lower power consuming bandwidth (the first bandwidth). Thus at 250, the transceiver 115 is switched to temporarily operate at the second bandwidth and then the transceiver 115 is returned to operate at the first bandwidth when the task is complete or a time period has expired.

In one embodiment, the operating condition is a presence of data in a queue to be transmitted. For example, when the station 125 is idle or in a power save mode, the transceiver 115 is operated at a lower bandwidth. But when the station 125 has data to transmit, this event triggers the bandwidth controller 155 to switch the operating bandwidth of the transceiver 115 to a larger bandwidth to transmit the data (e.g., one or more packets). In some conditions, switching to a larger bandwidth may actually save power to transmit the packet(s) because as the transmission rate of the packet increases, it takes less time to transmit the packet(s). An example method for transmitting packets is shown in FIG. 3.

Figure 3:
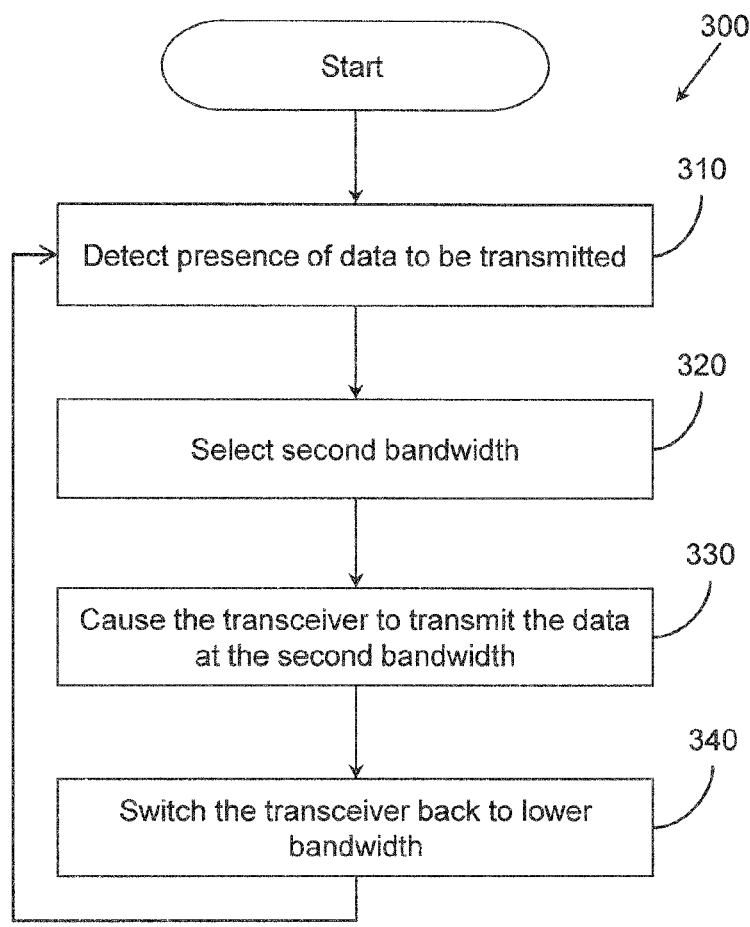
FIG. 3 illustrates another embodiment of a method associated with switching bandwidth.

With reference to FIG. 3, one embodiment of a method 300 is illustrated that is associated with switching bandwidths for data transmission. Assume that the transceiver 115 is inactive and is operating at the first bandwidth (e.g., 20 MHz). At 310, the presence of data to be transmitted is detected. This may be detected from having data in a transmission queue and/or receiving a request to transmit data. At 320, if the data is present, then a second bandwidth is selected that has a greater bandwidth than the first bandwidth (e.g., 80 MHz or 160 MHz). In one embodiment, the selected bandwidth may be a predetermined default bandwidth or can be selected based on other conditions such as a compatible bandwidth with a device to which the data is being transmitted or based on available communication channels.

At 330, the transceiver 115 is caused to transmit the data at the second bandwidth. Thus the data is transmitted at a higher bit rate. At 340, after the transmission of the data is completed, the transceiver 115 is switched back to operate at the lower bandwidth in response to the completion (e.g., final ACK received from destination device) or after some time period (e.g., hysteresis time) even if there are no more packets in the transmission queue. The method 300 then returns and waits until it detects the next data to be transmitted.

In another embodiment, the operating condition includes receiving a packet by the transceiver 115. For example, the transceiver 115 may be idle for some time (not transmitting or receiving packets) and thus operating at a low bandwidth. When a packet is received, this event triggers the transceiver 115 to switch to operate at a larger bandwidth to process the packets. Thus in response to receiving the packet, the bandwidth controller 155 dynamically causes the transceiver 115 to operate at a larger bandwidth until reception of the data (the entire group of packets) is complete. After the reception is complete, the transceiver 115 is switched back to operate at the low bandwidth.

In one embodiment, suppose the station 125 receives packets on a primary communication channel. If the station 125 receives a packet with a partial AID to its own AID and channel bandwidth indicating 40/80/160/or 80+80 MHz, the transceiver 115 is switched to operate at the larger bandwidth as indicated in the received packet. In one embodiment, the bandwidth switch occurs after the reception of the first packet in the group. In this scenario, the first packet is dropped since at first the transceiver 115 and the remote device are operating at mismatched bandwidths. The remote device will then resend the packet, which would then be received properly because of the bandwidth change. In another embodiment, the bandwidth is switched in advance to allow reception of the first packet.

One or more different events may be implemented as the operating condition (FIG. 2, block 220) that causes the switching of the operating bandwidth. The following examples are not intended to be limiting.

Mobile Hot Spot Example

The station 125 uses WiFi for tethering and access to the Internet. The transceiver 115 is operated at a low bandwidth (e.g., 20 MHz) during a variety of preliminary events: mobile hotspot is turned on and beaconing is performed (transmits beacons, responds to probe requests); station connects to the mobile hotspot (association request/response; and establish secure connection). Once data is available to transmit from the station 125 (or when data is being received), the transceiver 115 is switched to the larger bandwidth (e.g., 80 MHz) to transmit the data and receive acknowledgements, or to receive data and transmit acknowledgements. When data transmission or reception is complete, the station 125 becomes inactive and the transceiver 115 is switched back to the lower bandwidth 20 MHz.

WiFi Display Example

For Wi-Fi Display applications, suppose WiFi is turned on but not being used. The station 125 is operating in IEEE power save mode. During power save mode, the transceiver 115 is operated at the low bandwidth (e.g., 20 MHz). This bandwidth is used to perform, for example: receiving beacons and receiving broadcast traffic. Once a user of the station 125 initiates a WiFi-Display session, this event triggers the station 125 to come out of the power save mode. This in turn triggers the transceiver 115 to switch and operate at a larger bandwidth (e.g., 80 MHz) to perform the next action(s) of the display session (e.g., WiFi-Display capability negotiation and start WiFi-Display traffic). After the user ends the WiFi-Display session, the transceiver 115 switches back to the low bandwidth 20 MHz and the station 125 may return to the power save mode.

Web Browsing Example

For web browsing applications, suppose WiFi is turned on in the station 125 but is not currently being used. The station 125 is operating in a power save mode and the transceiver 115 is set to operate at the low bandwidth 20 MHz. The transceiver 115 is operated at the low bandwidth, for example, while the station 125 receives beacons and receives broadcast traffic. Assume the station 125 will be in power save mode most of the time. Once a user of the station 125 accesses or otherwise clicks on a web page, this event triggers the station 125 to come out of the power save mode. This in turn triggers the transceiver 115 to switch to operate at a larger bandwidth (e.g., 80 MHz) to perform the next actions such as: sending a URL; receive traffic from the URL; and send TCP acknowledgements. Once complete, the transceiver 115 switches back to operate at the low bandwidth 20 MHz while the user is reading the web page, and the station 125 may return to the power save mode.

With the present techniques of dynamic bandwidth switching, power consumption may be reduced. As a comparison example, suppose a wireless device consumes power as follows: 200 mW consumed when operating at 20 MHz; 250 mW consumed when operating at 40 MHz; and 400 mW consumed when operating at 80 MHz. Thus assuming that the wireless device (station 125) transmits and receives packets only 10% of the time, using the present technique of dynamic bandwidth switching, the wireless device would consume at an average 216 mW (by operating at 20 MHz 90% of the time and switching to 80 MHz 10% of the time for transmitting/receiving data). Without using dynamic bandwidth switching and operating at 80 MHz continuously, the device would consume 400 mW. This is a savings of 46% in power consumption yet the same transmission/reception throughput is provided.

The dynamic bandwidth switching allows a device to have power consumption comparable to IEEE 802.11n 20 MHz but at the same time provides the ability to deliver Gigabit per second throughput when desired.

Embodiment

Dynamic Bandwidth Power Save Through Indicator

Figure 4:
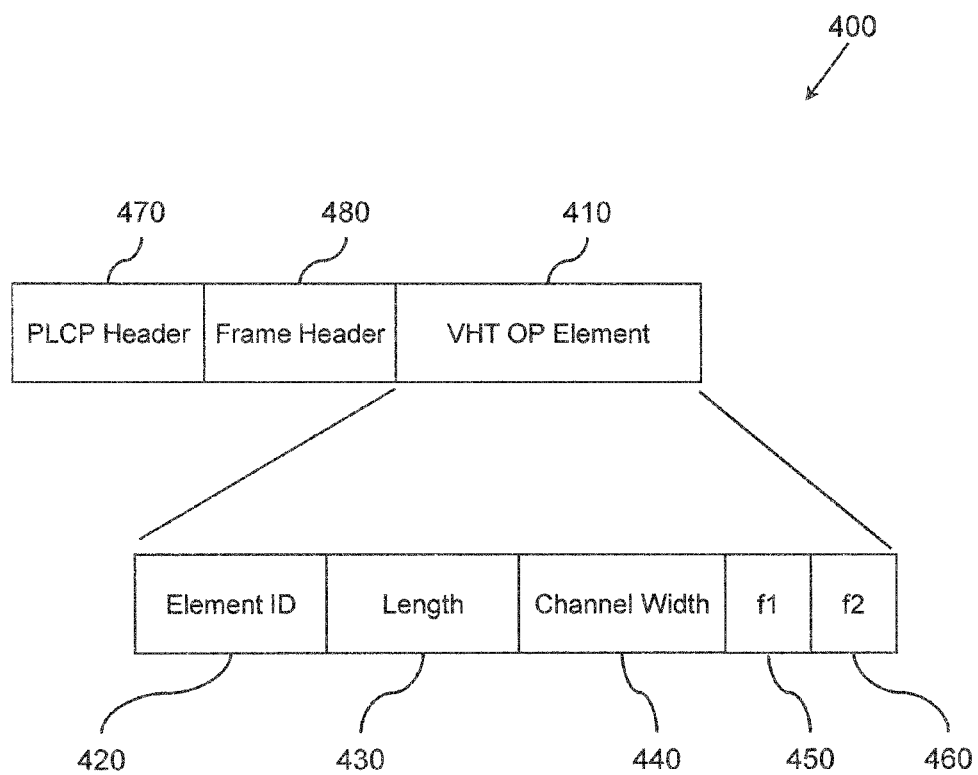
FIG. 4 illustrates one embodiment of packet structure associated with indicating bandwidth.

With reference to FIG. 1 and FIG. 4, in another embodiment, the bandwidth controller 155 is configured to change the bandwidth of the transceiver 115 in response to an event and then control another device (e.g., the access point 140) to communicate at the changed bandwidth via a transmitted indicator. For example, the indicator may be a setting in a packet such as a VHT (very high throughput) operational element in a MAC packet or other setting that indicates to the access point 140 which bandwidth the station 125 is currently operating at.

In one embodiment, FIG. 4 illustrates an example structure of a MAC packet 400 that includes a VHT (very high throughput) operation element 410 which is used to indicate bandwidth. The VHT operation element 410 includes one or more fields, for example, an element ID 420, length 430, channel width 440, and/or other fields f1 450, and f2 460. In one embodiment, the channel width field 440 is used to indicate which bandwidth the station 125 is operating at. For example, values may be set as follows: 0 for 20 and 40 MHz; 1 for 80 MHz; 2 for 160 MHz; and 3 for 80+80 MHz. Packet 400 may include other fields like a PLCP header 470 (Physical Layer Convergence Protocol) and frame header 480. Other fields may also be included.

Figure 5:
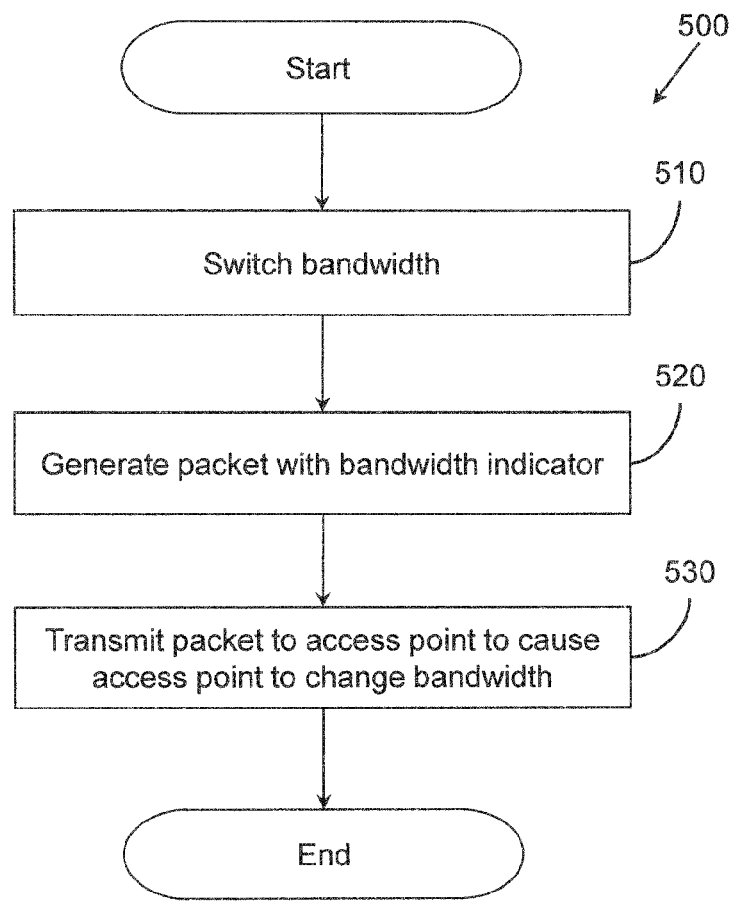
FIG. 5 illustrates another embodiment of a method associated with switching bandwidth.

With reference to FIG. 5, one embodiment of a method 500 is illustrated that is associated with switching bandwidth and using an indicator as described above. At 510, the bandwidth of the transmitter is switched in response to an event. The bandwidth may be increased or decreased depending on the event as described in previous examples. At 520, a packet is generated and a bandwidth indicator value is set to identify the current bandwidth that the station 125 is operating at. In one embodiment, the value is set in the channel width field 440 in the VHT operational element 410 as shown in FIG. 4. At 530, the packet is transmitted to the access point 140 (or other device in communication with the station 125), which causes the access point 140 to change its operating bandwidth to the bandwidth indicated in the packet.

Thus in one embodiment, the station 125 may control the operation of another wireless device in a basic service set (BSS) by sending VHT operation or capabilities information in the packet. The VHT operation information may be included in any new or existing management/control/data frames like in management frames such as the beacon, secondary/auxiliary beacon, or probe response frames.

In this manner, the station 125 can indicate a current operational bandwidth/capability of the station 125 through the VHT operation element 410 (FIG. 4).

As described previously, based on the operations or events being performed by the station 125, the bandwidth changes. For example, if the station 125 does not have high bandwidth traffic to send to the AP 140, the station 125 can indicate through the VHT operation element 410 that it is operating in a lower bandwidth mode. If the station 125 has traffic to send, the station 125 switches to operate in a higher bandwidth mode and re-sends the VHT operation element 410 indicating the new higher bandwidth. If the station 125 starts to receive traffic from the AP 140, the station 125 then switches to operating in higher bandwidth mode and also indicates to the AP 140 through the VHT operation element 410 that it is operating in a higher bandwidth mode.

DEFINITIONS

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements (e.g., the bandwidth controller 155, and so on).

While for purposes of simplicity of explanation, illustrated methodologies are shown and described as a series of blocks. The methodologies are not limited by the order of the blocks as some blocks can occur in different orders and/or concurrently with other blocks from that shown and described. In some embodiments, fewer than all the illustrated blocks may be used to implement an example methodology. Blocks may be combined or separated into multiple components. Furthermore, additional and/or alternative methodologies can employ additional actions that are not illustrated. In some embodiments, device hardware is implemented to perform one or more methods described herein and/or is programmed with an equivalent algorithm.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus comprising:
   a transceiver configured to operate at a first bandwidth;
   a bandwidth controller configured to
      detect an operating condition of the apparatus;
      select a second bandwidth from a plurality of available bandwidths based on the operating condition; and
      cause the transceiver to temporarily operate at the second bandwidth and then cause the transceiver to subsequently operate at the first bandwidth;
   wherein the operating condition includes receiving a packet by the transceiver, wherein the packet is part of a group of packets;
   and in response to receiving the packet, the bandwidth controller is configured to
      dynamically cause the transceiver to operate at the second bandwidth that has greater bandwidth than the first bandwidth until reception of the group of packets is complete, and
      cause the transceiver to operate at the first bandwidth after the reception is complete.

2. The apparatus of claim 1, wherein the bandwidth controller is configured to dynamically cause the transceiver to operate at the second bandwidth after the packet is received.

3. An apparatus comprising:
   a transceiver configured to operate at a first bandwidth;
   a bandwidth controller configured to
      detect an operating condition of the apparatus;
      select a second bandwidth from a plurality of available bandwidths based on the operating condition; and
      cause the transceiver to temporarily operate at the second bandwidth and then cause the transceiver to subsequently operate at the first bandwidth;
   wherein the bandwidth controller is configured to cause the transceiver to return to operate at the first bandwidth after data is transmitted at the second bandwidth; and
   the transceiver is configured to transmit a packet to an access point wherein the packet includes an element that indicates to the access point that the transceiver is operating at the first bandwidth, which causes the access point to communicate with the transceiver at the first bandwidth.

4. The apparatus of claim 2, wherein the operating condition includes a presence of data in a queue to be transmitted; and
   wherein the bandwidth controller is configured to:

detect the presence of the data in the queue, and if the data is present:
    select the second bandwidth that has a greater bandwidth than the first bandwidth;
    cause the transceiver to transmit the data at the second bandwidth; and
    cause the transceiver to operate at the first bandwidth after the data is transmitted.

5. The apparatus of claim 3, wherein the operating condition is a power save mode; wherein the first bandwidth is a low power consuming bandwidth; wherein the second bandwidth has greater bandwidth than the first bandwidth; and
    wherein the bandwidth controller is configured to cause the transceiver to switch to the second bandwidth when an event occurs that causes the apparatus to transition from the power save mode to a non-power save mode; and
    wherein the bandwidth controller is configured to cause the transceiver to return to operate at the first bandwidth when the event is completed.

6. The apparatus of claim 3, wherein bandwidth controller is configured to select the first bandwidth from the plurality of available bandwidths, wherein the first bandwidth is a lower bandwidth than the second bandwidth.

7. A method comprising:
    operating a transceiver at a first bandwidth, wherein the transceiver is implemented in a communication device;
    detecting an operating condition of the communication device;
    selecting a second bandwidth from a plurality of available bandwidths based on the operating condition; and
    switching the transceiver to temporarily operate at the second bandwidth and then cause the transceiver to subsequently operate at the first bandwidth;
    wherein switching the transceiver to return to the first bandwidth occurs after data is transmitted at the second bandwidth; and
    transmitting a packet to an access point wherein the packet includes an element that indicates to the access point that the transceiver is operating at the first bandwidth, which causes the access point to communicate with the transceiver at the first bandwidth.

8. The method of claim 7, wherein the operating condition includes a presence of data to be transmitted; and the method further comprising:
    detecting the presence of the data in a queue, and if the data is present;
    selecting the second bandwidth that has a greater bandwidth than the first bandwidth;
    causing the transceiver to transmit the data at the second bandwidth; and
    causing the transceiver to operate at the first bandwidth after the data is transmitted.

9. The method of claim 7, wherein:
    the operating condition includes receiving a packet by the transceiver where the packet is part of a group of packets;
    and in response to receiving the packet
        dynamically causing the transceiver to operate at the second bandwidth that has greater bandwidth than the first bandwidth until reception of the group of packets is complete; and
        causing the transceiver to operate at the first bandwidth after the reception is complete.

10. The method of claim 9, wherein dynamically causing the transceiver to operate at the second bandwidth occurs after the packet is received.

11. The method of claim 7, wherein the operating condition is a power save mode; wherein the first bandwidth is a low power consuming bandwidth; wherein the second bandwidth has greater bandwidth than the first bandwidth; and
    wherein the method further comprises causing the transceiver to switch to the second bandwidth when an event occurs that causes the communication device to transition from the power save mode to a non-power save mode; and
    causing the transceiver to switch from the second bandwidth to the first bandwidth when the event is completed.

12. The method of claim 7, further comprising generating the packet and setting a value in the element, wherein the element is a field in a very high throughput (VHT) operation element.

13. An integrated circuit comprising:
    a transceiver configured to operate at a first bandwidth;
    a bandwidth controller configured to
        detect an operating condition of the transceiver;
        select a second bandwidth from a plurality of available bandwidths based on the operating condition; and
        cause the transceiver to temporarily operate at the second bandwidth and then cause the transceiver to subsequently operate at the first bandwidth;
    wherein the bandwidth controller is configured to cause the transceiver to return to the first bandwidth after data is transmitted at the second bandwidth; and
    the transceiver is configured to transmit a packet to an access point wherein the packet includes an element that indicates to the access point that the transceiver is operating at the first bandwidth, which causes the access point to communicate with the transceiver at the first bandwidth.

14. The integrated circuit of claim 13, wherein the operating condition includes a presence of data in a queue to be transmitted; and
    wherein the bandwidth controller is configured to:
        detect the presence of the data in the queue, and if the data is present:
        select the second bandwidth that has a greater bandwidth than the first bandwidth;
        cause the transceiver to transmit the data at the second bandwidth; and
        cause the transceiver to operate at the first bandwidth after the data is transmitted.

15. The integrated circuit of claim 13, wherein the operating condition includes receiving a packet by the transceiver where the packet is part of a group of packets, and in response to receiving the packet:
    the bandwidth controller is configured to:
        dynamically cause the transceiver to operate at the second bandwidth that has greater bandwidth than the first bandwidth until reception of the group of packets is complete; and
        cause the transceiver to operate at the first bandwidth after the reception is complete.

16. The integrated circuit of claim 13, wherein the bandwidth controller is configured to dynamically cause the transceiver to operate at the second bandwidth after the packet is received.

17. The integrated circuit of claim 13, wherein the operating condition is a power save mode; wherein the first bandwidth is a low power consuming bandwidth; wherein the second bandwidth has greater bandwidth than the first bandwidth; and
    wherein the bandwidth controller is configured to cause the transceiver to switch to operate at the second bandwidth when an event occurs that causes a device that includes the integrated circuit to transition from the power save mode to a non-power save mode; and wherein the bandwidth controller is configured to cause the transceiver to return to operate at the first bandwidth when the event is completed.

\* \* \* \* \*